United States Patent [19]

French

[11] 3,928,013

[45] Dec. 23, 1975

[54] METHOD FOR THE DIRECT MANUFACTURE OF TEMPERED GLASS SHEETS FROM A RIBBON OF GLASS

[75] Inventor: Walter K. French, Montrose, N.Y.

[73] Assignee: The Seagrave Corporation, New York, N.Y.

[22] Filed: May 17, 1974

[21] Appl. No.: 470,815

Related U.S. Application Data

[63] Continuation-in-part of Ser. No. 426,526, Dec. 20, 1973, Pat. No. 3,875,766.

[52] U.S. Cl. .................................. 65/97; 65/176
[51] Int. Cl.² ...................................... C03B 21/02
[58] Field of Search ............ 65/95, 96, 97, 174, 176

[56] References Cited
UNITED STATES PATENTS

| | | | |
|---|---|---|---|
| 2,291,127 | 7/1942 | Wilson | 65/95 |
| 3,189,424 | 6/1965 | Brichard et al. | 65/97 X |
| 3,754,884 | 8/1973 | McDavid et al. | 65/97 |

Primary Examiner—Arthur D. Kellogg
Attorney, Agent, or Firm—Mark T. Basseches; Paula T. Basseches

[57] ABSTRACT

The present invention is directed to an improved method of manufacturing tempered glass sheets on a continuous basis from a band drawn from a melt, and to an improved method of cutting bands of hot glass. The method is characterized by subjecting a continuous ribbon or band of glass emerging from a glass fabricating furnace or from the terminal stages of a float process, the glass being at a temperature suitably high for subsequent tempering, e.g., preferably at or near the annealing point, to a cutting procedure involving drawing a scoring implement pressed against the surface of the band transversely across the band, the tip portion of the scoring implement being continuously supplied with limited quantities of a liquid, the quantities being sufficient to flow or be drawn into the minute fissures formed by the scoring implement but not so great as to flow or engage to any significant extent glass portions beyond the score line. The thus scored glass, preferably promptly after the formation of the score, is flexed about a bending axis coincident with the score to separate the increments of the band along the score line, the separated increment being thereafter subjected to quenching influences.

6 Claims, 2 Drawing Figures

METHOD FOR THE DIRECT MANUFACTURE OF TEMPERED GLASS SHEETS FROM A RIBBON OF GLASS

This application is a continuation-in-part of my application Ser. No. 426,526, filed Dec. 20, 1973 now U.S. Pat. No. 3,875,766.

BACKGROUND OF THE INVENTION

1. Field of the Invention

The present invention is in the field of glass manufacture and more particularly is in the field of manufacturing tempered glass sheets and cutting glass sheets at elevated temperatures.

2. The Prior Art

As is well known, tempered glass possesses certain significant advantages over conventional annealed glass and by reason of such advantages, the use of tempered glass sheets is increasing notwithstanding a significant cost differential between tempered and annealed glass.

Tempered glass possesses the advantage of increased mechanical strength as well as increased resistance to thermal and mechanical shocks. In addition, tempered glass provides substantial safety factors in that when it does break, the entire piece "dices" or falls into a multiplicity of small fragments, the edges of which are relatively dull. The safety advantages of tempered glass are such that its use has been legally mandated in certain installations.

Notwithstanding the known superiority of tempered glass, the increased rate at which tempered glass is being used has been inhibited by the substantially greater cost of tempered glass than annealed glass.

Since glass sheets cannot be cut after tempering and retain their inherent or unique characteristics, tempered sheets have conventionally been available only in a limited number of stock sizes, a factor further inhibiting the use of tempered glass.

Tempered glass is conventionally manufactured by first cutting annealed glass sheets to the desired size. The exposed edges of the subdivided sheet to be tempered are thereupon carefully ground or seamed to preclude the existence of microscopic fissures along the edges. Thereupon, the edge-treated sheet of annealed glass is introduced into an oven and is heated to a temperature which varies in accordance with the glass composition employed, being normally in the range about 1050° to 1250°F for conventional soda-lime window glass compositions.

The heated sheet is thereupon introduced into a quench, which functions rapidly to extract heat from the surfaces of the sheet, the quench normally including means for impinging high volumes of air at ambient temperatures against the exposed surfaces of the sheet with equal distribution, so that the cooling effects are substantially uniform on all areas of the sheet surfaces. After a period of time in the quench, the time being a function of the thickness of the glass, the sheet is removed and further cooled, if necessary.

In the quenching procedures, the external surfaces of the glass cool and contract prior to the interior of the glass, the interior components being still mobile. On cooling of the interior components of the glass, the tendency of such components to contract is resisted by the fact of their connection to the already cooled and immobilized external surfaces, whereupon the external surfaces of glass are permanently under compression and the internal components under tension.

Obviously, the conventional method of producing tempered sheets which involves slowly cooling a glass band emerging from a melt to anneal the same, cutting the annealed band into sheets, grinding the edges of the subdivided sheets, and reheating the edge-ground sheets, involves significant costs and expenditures of energy, particularly considering the fact that the crude glass emerging from the melt is already heated and must slowly be cooled in the annealing ovens, only to be reheated for tempering. Moreover, even where a careful grinding of the edges of the annealed sheets preparatory to tempering has been carried out, a substantial incidence of breakage is experienced in the tempering process and particularly in the initial phases thereof. Attempts have been made to eliminate the grinding step, but an even higher incidence of breaking of the annealed sheets has been experienced in such case.

Various methods have been suggested for the direct fabrication of tempered glass sheets without the intermediate steps of annealing, curing, reheating and quenching.

By way of example, reference is made to U.S. Pat. Nos. 2,243,149, 2,291,127 and 2,293,537. Each of the noted patents is generally directed to forming glass melt into a band or ribbon and, without annealing, subjecting the glass to a quenching step. Each of the noted patents suggests cutting the ribbon to separate the ribbon into discrete sheets before or after the quench.

Insofar as is known, the methods suggested in the patents have not proven commercially feasible, due principally to deficiencies in separating discrete sheets from the continuous ribbon. The patents suggest a variety of ways of separating the sheets, including rollers having mating lands which press into the molten glass, separating discrete segments which are thereafter subjected to a quench; the use of blow pipe cutting type apparatus on a continuous ribbon which has ready been tempered; formation of valleys in the glass ribbon which is thereafter quenched, the glass increments demarcated by the valleys being separated by breaking the valleys after cooling, etc.

Each of the noted separating steps has been attended by sufficient disadvantages to preclude commercial acceptance.

The operation of dividing a molten glass band into discrete sheets is, at best, a difficult one, resulting in the formation of irregular edges, the surface areas of the band adjacent the edges evidencing irregularities and ripples. Similar effects are observed in the case of blow pipe cutting, (the method suggested for cutting sheets from an already tempered band), such method being inherently time consuming, inexact, and resulting in addition to a high percentage of breaking and detempering of the sheet in the areas of application of the flame and adjacent areas. The method of thinning and thereafter separating the processed sheets in the thinned separation areas has involved disadvantages mentioned above in respect of separating molten glass, and the additional disadvantage of substantial incidence of breakage of the entire sheet, since it is obvious that the remaining flash must be somehow removed before the sheets may be advantageously employed.

Thus, notwithstanding the obvious theoretical economies of directly forming tempered glass sheets without annealing, cutting, grinding, etc., all known commercial tempered sheet is produced from annealed stock.

A further factor increasing the cost of tempered glass over annealed glass is that tempered glass sheets cannot practically be subdivided. If tempered glass could be readily cut, it would, of course, be feasible directly to produce a substantial length of tempered glass ribbon and thereafter subdivide the same.

A method suggested for the cutting and drilling of tempered glass is disclosed in U.S. Pat. No. 3,150,950, which method involves treating the sheet temporarily to relieve the permanent strain structure in the glass and cutting while the sheet is in the strain relieved condition.

In accordance with the method of the noted patent, a tempered glass sheet is heated to a temperature below the temperature at which the permanent strains within the sheet are relieved (strain relief temperature), and the sheet thereupon subjected to a cooling blast on its surfaces. The differential temperatures within the glass sheet, wherein the hotter interior is in a relatively expanded condition as contrasted with the cooler external surfaces, temporarily counteract the permanent strain pattern, permitting the glass to be scribed and broken in a conventional manner. After the tempered glass has been cut or drilled, it is allowed to cool, following which cooling the original strain patterns are said to return.

A substantial problem inhering in the method of the above described patent lies in the fact that the cut or drilled sheet leaves an exposed tension zone along the cut edge, rendering the sheets far less stable than conventionally fabricated tempered glass sheets. It is not uncommon for a tempered sheet processed as above described to dice spontaneously after the passage of time, such dicing perhaps resulting from an unexplained spreading of microscopic fissures within the tension zone. Additionally, dicing may result from shock applied to the sheet, and particularly to an exposed tension zone, with the result that utilization of the cut sheets is feasible only where great pains have been taken to insulate and protect the exposed tension zone from contact with any object, and the sheets themselves from any vibratory influence.

SUMMARY

The present invention is directed to a method of manufacturing discrete tempered glass sheets directly from a ribbon or band of glass emerging from any conventional glass fabricating process, such as in the final stages of a float process, basin furnace, etc.

In accordance with the invention a glass band or ribbon, at a temperature below the softening point, above the strain relief point, the glass being preferably at about the annealing temperature, is scored transversely by a conventional scoring implement, such as a cutting wheel, diamond point, etc., the tip of the implement being continuously supplied during the scoring step with minute quantities of a liquid. The liquid is supplied in such manner and limited amount as to avoid, as far as possible, contact with the glass laterally of the furrow or score line formed by the transversely moving scoring implement.

The invention is predicated upon the discovery that microscopic fissures are formed depthwisely in the heated glass in the path of the score line, in much the same manner as such fissures are formed when glass is conventionally scored at room temperatures.

The invention is further predicated upon the discovery that by supplying minute quantities of liquid in the course of formation of the score line across the hot glass, minute quantities of the liquid flow or are drawn into the fissures, perpetuating the existence of the fissures for a time sufficient to enable the glass to be broken by flexure, utilizing the score line as the bending axis.

In further explanation, it is well known that when glass is scored at room temperatures there is, in addition to the furrow or cumbled V of glass existing at the glass surface, a multiplicity of downwardly extending fissures interlinked to a greater or lesser degree, depending upon the efficiency with which the socre was formed. It is further well known that by applying a bending stress coincident with the score line, a break may be effected along the line of the score.

Experimental attempts to cut glass by drawing a scoring implement across the glass surface while the same is in the temperature range of the annealing point of the glass have proven totally ineffective. While the movement of the scoring implement across the glass results in the formation of a depression or furrow, attempts to fracture the glass along the furrow line have been unsuccessful.

Heretofore it was apparently considered that the reason that glass in the temperature range noted could not be broken in the manner described was that the minute fissures apparent at room temperatures were not believed to exist or subsist when heated glass was scored. I have discovered that when heated glass is subjected to a scoring step, that minute fissures are indeed formed but that, by reason of the amorphous nature of the glass composition, such fissures are transitory and are believed rapidly to heal themselves.

The invention is predicated on the discovery that by the application at the interface between the tip of the scoring implement and the glass surface of a band, ribbon or sheet of heated glass, in the range between the softening point and strain relief point, and preferably at or near the annealing point, of minute quantities of liquid, the fissures are perpetuated for a temporal period sufficient to permit the band to be fractured along the score line by applying bending stresses along the line in a more or less conventional manner.

Without limitation, it is believed that the opening of the fissures in the presence of the liquid results in the drawing of minute increments of the liquid into the fissures, such that the same reach or approach the tension zone created at the lowermost (depthwise) edge of the fissures. Since the fissures are of micron size, in the area of about 1 to 5 microns, it is believed that the introduction of the fluid into the fissures results not from a conventional flowing action but, rather, from capillary effects or perhaps from the creation of a vacuum in the voids formed by opening of the fissures. As a result of the entrance of the liquid, the existence of the fissures is extended for temporal periods sufficient to permit the same to be broken along the score line, the flexing preferably being effected as soon as possible after entry of the liquid into the fissures.

The liquids are considered to extend the life of the fissures by preventing the immediate rehealing of the fissures, which rehealing, in the absence of the liquid, would normally be effected in such time period as to give rise to the theory that the fissures did not exist at all.

As will be more fully set forth hereinafter, the liquid may comprise distilled water, in which case it is believed that the fissure healing effects are delayed as a result of the temporary cooling influences to which the base portions of the fissures have been subjected, resulting from the extraction of heat from the fissure components, resulting in a boiling off of the water.

A somewhat greater delay of fissure healing may be achieved by dissolving in the liquid an organic or inorganic agent which, in addition to the cooling effects above noted, operate to introduce into the fissures a contaminant which delays healing.

It is believed that similar delaying effects may be achieved through the use of contaminants comprising colloidal suspensions where the particle size is less than the fissure size.

In considering the ensuing description, it should be appreciated that the same does not encompass an exhaustive enumeration of materials which may effectively be employed to "poison" or delay healing of the fissures and, indeed, it is believed that an infinite number of compositions may be more or less advantageously employed.

From the foregoing it will be appreciated that the cutting method permits discrete glass sheets to be separated from the band at high temperatures, the sheets, after separation, being still at a temperature at which subsequent quenching influences will be effective fully to temper the sheets.

As in the case of my above cited application, the cuts formed as a result of the procedure are, for reasons not altogether clear, of such nature that the resultant edges of the sheet need not be ground in order to assure that cuts do not propagate in the tempered sheet.

It will be further understood that when the separated sheets are subjected to quenching influences, a temper is introduced not only in the upper and lower surfaces but, in addition, in the edges defined by the cut, whereby the tempered sheet is stable and includles no exposed tension zones likely to form the starting point for fissures.

There is thus produced in accordance with the invention tempered glass sheets without the necessity for slow cooling to anneal, cutting, edge grinding, reheating, and quenching, as has been the practice heretofore in the manufactured of tempered glass.

While the present description of the cutting step has been directed specifically to transverse cuts, the same way be applicable to the formation of longitudinally extending cuts.

Accordingly, it is an object of the invention to provide an improved method of directly forming tempered glass sheets from a melt, including as a step of the method a procedure for forming transverse cuts along the advancing ribbon or band through scoring of the band while the latter is above the strain relief temperature, below the softening point, and preferably in the range of annealing temperature, utilizing a scoring implement having means for supplying minute quantities of liquid to the score as it is being formed.

It is a further object of the invention to provide an improved cutting process of the type described particularly adapted for use in cutting, by scoring, of hot glass bands, ribbons or the like.

It is still a further object of the invention to provide a continuous process for the formation of tempered sheets not requiring reheating of the glass ribbon emerging from the glass fabricating apparatus, incorporating as an integral step, separating the ribbon into discrete sheets through the use of at least a transverse cutting step, as hereinabove described.

To attain these objects and such further objects as may appear herein or be hereinafter pointed out, reference is made to the accompanying drawings, forming a part hereof, in which.

Figure 1:
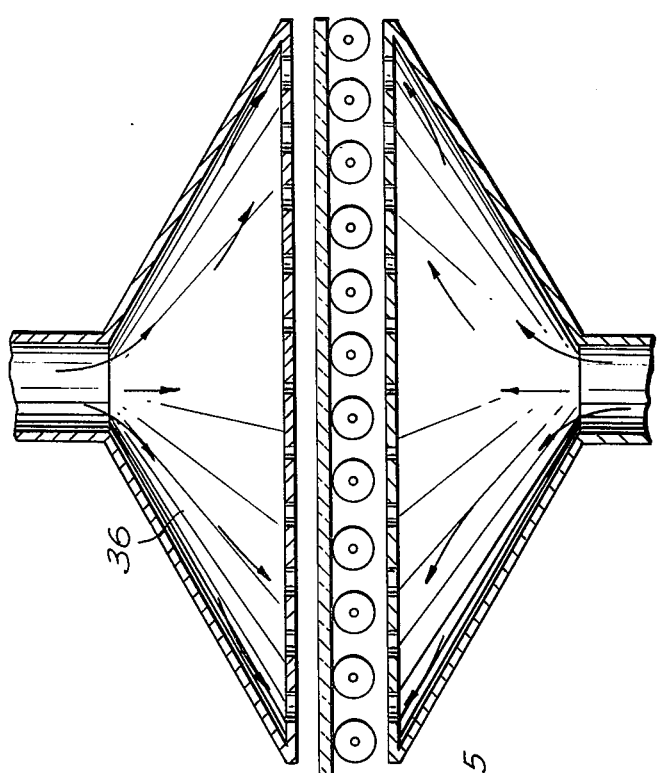
FIG. 1 is a diagrammatic vertical sectional view of a continuous apparatus for forming tempered glass sheets from a ribbon of glass emerging from a melt.

Turning now to the drawings, there is shown in FIG. 1 a diagrammatic representation of a glass fabricating furnace 10 wherein there is contained a molten batch 11 of glass.

It will be recognized that glass processing steps including times, temperatures, etc. will vary significantly in accordance with the glass composition used, the instant invention being described, by way of example only, in conjunction with a conventional soda-lime glass formulation.

The glass band or ribbon flows in a conventional manner outwardly through the adjustable gate mechanism 12 of the furnace 10 between spaced delivery and doctoring rolls 13, 14. While the illustration of FIG. 1 diagrammatically discloses a horizontal draw process, it will be readily appreciated that the instant invention is equally adaptable for use with a vertical take-off procedure.

The advancing ribbon or band 15 of glass which, by this time, has been drawn and rolled to the desired thickness, is passed over transport rolls 16 to a cutting station 17. The cutting station 17 may include a heat resistant endless belt or band 18, arrayed about drive rollers 19, 20, driven at a linear speed corresponding to the speed of advance of the glass band or ribbon 15.

Located at the cutting station 17 is a cutting assembly 21 consisting, as diagrammatically illustrated, of a scoring device 22 supported on a movable drive arm 23, which arm is in turn connected with drive mechanism (not shown) for moving the assembly 21 and scoring member 22 transversely across the surface of the ribbon, with the scoring element in pressure contact with the uppermost surface of the glass.

As is known per se, the drive arm 23 may be moved in a compound manner simultaneously transversely of the sheet and forwardly in the direction of feed of the ribbon so that the score line is formed precisely perpendicularly to the side marginal edges of the ribbon.

A backing anvil 24 is preferably provided beneath the upper flight of the moving belt 18 to provide a supporting surface for the advancing glass when the same is pressed downwardly by its own weight and by the additional downward forces applied through the scoring member 22.

The scoring assembly 21 includes a conduit 25 or like source of liquid supply, terminating in a release orifice 26 (see FIG. 2) engaged against a portion of the scoring member 22. Means are provided within the conduit or supply 25 for metering the flow of liquid to the scoring element 22.

By way of example, a soda-lime glass composition in accordance with the following values:

| | |
|---|---|
| flow point | 1690°F |
| soft point | 1350°F |

-continued

| | |
|---|---|
| anneal point | 1020°F |
| strain relief point | 950°F | may be treated as follows:

The ribbon 15 of glass of the noted composition emerging from the delivery rolls 13, 14 is advanced over the transport rolls 16 at such rate that its temperature is reduced from the original melt temperature of upwardly of 2000°F to at or near the annealing temperature of 1020°F as it reaches the cutting station 17. As the ribbon passes beneath the station 17, the drive arm 23 is energized so as to perform a cutting cycle whereat, as previously noted, the arm is shifted transversely and forwardly so as to press the scoring element 22 against the uppper surface of the glass and form therein a score line which is essentially perpendicular to the direction of advance of the ribbon.

In accordance with a typical example wherein an 11 foot wide sheet or ribbon of glass is to be cut, the arm 23 is preferably scanned across the sheet at a rapid linear speed. The cutter mechanism is adjusted in such manner that the cutter 22 is pressed against the upper surface of the glass ribbon with a downward force of about 9 pounds.

The principal contribution of the present invention lies in the innovation of supplying to the area or position at which the score is actually being formed, minute quantities of liquid directly to or flowing to the score area 27 as the score is being formed in the glass ribbon. The liquid flow is preferably effected in leading position relative to the direction of the score line being formed across the glass through the conduit 26.

Figure 2:
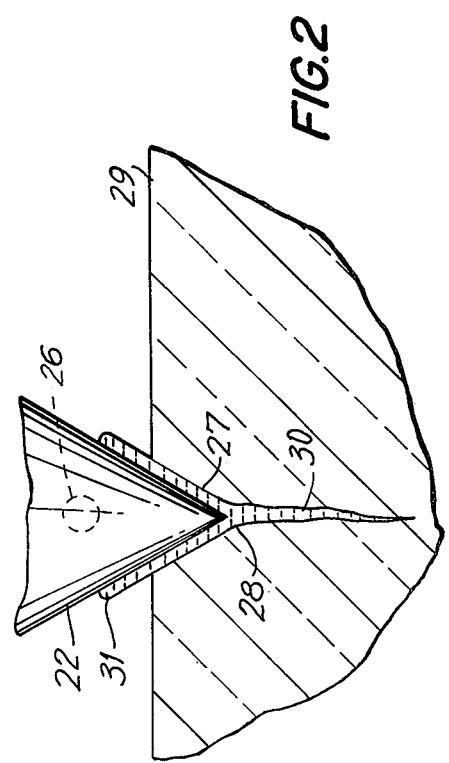
FIG. 2 is a greatly magnified diagrammatic vertical sectional view through a score in the process of being formed in accordance with the invention.

Referring more particularly to FIG. 2, there is diagrammatically shown, in exaggerated manner for clarity, a score being formed by the scoring implement 22, the score including a furrow or groove 28 at the upper surface 29 of the glass ribbon, and a series of depending fissures 30 extending downwardly from the groove 28.

As shown in said FIG. 2, a quantity of liquid 31 fed from the conduit 25 and emerging from the orifice 26, is illustrated as extending downwardly through the furrow 28 and into the area of the fissures 30. As a result of the liquid entry, the fissures 30 are prevented from healing, or from healing within a predetermined, exceedingly short time span. This temporary perpetuation of the fissures has been found to occur whether the liquid 31 consists of distilled water which, within an exceedingly short period of time, will be boiled off, with no trace thereof remaining in the fissure, or whether an adulterant, such as an inorganic or organic soluble material has been incorporated within the liquid 31. The delay in healing has been determined to be nominally longer where an adulterant is employed, and it is anticipated that continued trial and error experimentation will result in the discovery of preferred adulterating materials. By way of example, however, adulterants such as common sugars, colloidal dispersions of carbon and ammonium fluoride extend the period wherein the fissures are preserved. In similar fashion, liquids such as alcohol and C Cl₄ have likewise proven effective for the noted purpose.

It has been further demonstrated that other liquids, including kerosene and liquid Freon have, in varying degrees, proven successful in extending the effective existence of the fissures as a medium for propagating a cut or break. Organic materials appear to decompose at the high heats involved and leave in the fissures a carbon residue.

It is also conceivable to employ colloidal suspensions wherein the particle size of the colloid is sufficiently small to enter into the fissures, which fissures are estimated to have a widthwise dimension in the area of from 1 to 4 microns. It will be appreciated that only if an extremely fine particle size colloid is used will the colloid add materially to the effects of the liquid medium.

In selecting liquids for the treatment, it has been established that liquids having a high heat of vaporization or latent heat, such as water, are generally to be preferred to liquids having lower heats of vaporization. The above determination suggests that at least in part the extraction of heat from the intimately juxtaposed surfaces of the fissures may be responsible for the fissure prolonging effects above referred to.

Additionally, the viscosity of the liquid affects performance.

This fact was established by comparing the effect on breaking using as the liquid medium pure water, and sugar solutions embodying, respectively, 10% by weight and 50% by weight sugar. The 10% solution was found to increase the time period over which the glass could be successfully broken as compared to the pure water. However, the 50% by weight solution was found less effective than either the water or the 10% solution, leading to the theoretical conclusion that the greater viscosity prevented penetration into the fissure.

In any event, the physical act of flexing about the formed score line as a bending axis is most effectively carried out as soon as possible after formation of the score line, preferably within about one or two seconds.

Whether the influx of liquid into the fissures is the result of a capillary effect, the natural tendency of a substance to flow where a void has been created, or is due to some other phenonenon is not known.

Returning to FIG. 1, immediately following formation of the score at the station 17, there is provided a breaker roll, diagrammatically shown at 32, having a transversely extending eccentric breaker lip 33, the roll 32 being rotated to coordinate with the advance of the ribbon in such manner that the lip engages against and slightly lifts the under surface of the sheet in precise registry with the score formed on the upper surface. The amount of force required to effect the flexing action hereinabove noted is significantly smaller than the forces required for fracturing along a conventionally scored sheet at room temperature.

Following the action of the breaker roll 32, the separated sheet 34 comes under the complete control of the accelerator roll 35, whereupon the separated sheet 34 is spaced from the leading edge of the ribbon.

The sheet 34 is advanced between the opposed quench manifolds, diagrammatically illustrated at 36, whereupon the sheet 34, which enters at or near the annealing temperature, is subjected to the rapid quenching influences which result in tempering in a manner known per se.

It will be observed that since the cut-off edges of the sheet at the time of entry into the quench are at the annealing temperature, a temper will be induced in such edge portions.

Numerous variations may be made without departing from the spirit of the concepts hereinabove described, particularly in the times, temperatures and liquids and liquid additives applied to the score. Experimentation to achieve optimal results is suggested. For instance, different reagents maybe found more effective for different glass formulations. Additionally, some degree of success has been achieved in the use of reagents which attack and change the chemical formulation of the glass, e. g., certain fluorides.

Accordingly, the invention is intended to be broadly construed within the scope of the appended claims.

Having then described the invention and illustrated its use, what is claimed as new and is desired to be secured by Letters Patent is:

1. The process for the formation of discrete sheets of tempered glass directly from a flat, continuous band of glass withdrawn from a melt, said band being at a temperature below the softening point, above the strain relief point, and preferably in the range of the annealing point, comprising the steps of forming a score line by drawing a scoring implement pressed against a surface of said sheet transversely across said sheet while continuously supplying to the glass engaging tip of said implement limited quantities of liquid, said liquid being supplied at a rate to prevent lateral flow substantially beyond the path of said score line, thus to define a score line including depthwisely extending fissures into which increments of said liquid have been drawn, thereafter flexing said band about a bending axis extending through said score line, thus to break said band along said line and sever an increment from said band, and thereafter separating said severed increment from said band and subjecting the same to quenching influence to temper the increment.

2. The method in accordance with claim 1 wherein said liquid comprises water.

3. The method in accordance with claim 2 wherein said water includes a dissolved organic material.

4. The method in accordance with claim 2 wherein said liquid includes a dissolved inorganic material.

5. The method in accordance with claim 1 wherein said liquid comprises a colloidal suspension of particles having a size smaller than the transverse dimension of said fissures.

6. The method of cutting glass while the glass is at a temperature between the softening point and the strain relief point which comprises the steps of pressing a scoring implement against the surface of said glass while drawing said scoring implement transversely across said surface to form a score, the glass contacting portion of said scoring implement being continuously supplied with a limited quantity of liquid, thus to form a score line including depthwisely extending fissures into which increments of said liquid have been drawn, and thereafter flexing said scored glass about a bending axis extending through said score line, thus to break said glass along said line.

* * * * *